(12) United States Patent
Savarit et al.

(10) Patent No.: US 12,499,775 B2
(45) Date of Patent: Dec. 16, 2025

(54) DEVICE AND METHOD FOR ASSISTING AIRCRAFT GUIDANCE

(71) Applicant: THALES, Courbevoie (FR)

(72) Inventors: Vincent Savarit, Toulouse (FR); Bertrand Caudron, Tournefeuille (FR); Guy Deker, Cugnaux (FR)

(73) Assignee: THALES, Courbevoie (FR)

( * ) Notice: Subject to any disclaimer, the term of this patent is extended or adjusted under 35 U.S.C. 154(b) by 202 days.

(21) Appl. No.: 18/268,728

(22) PCT Filed: Dec. 21, 2021

(86) PCT No.: PCT/EP2021/087160
§ 371 (c)(1),
(2) Date: Jun. 21, 2023

(87) PCT Pub. No.: WO2022/136473
PCT Pub. Date: Jun. 30, 2022

(65) Prior Publication Data
US 2024/0038078 A1    Feb. 1, 2024

(30) Foreign Application Priority Data
Dec. 23, 2020   (FR) ...................................... 2014079

(51) Int. Cl.
*G08G 5/55*    (2025.01)
*G08G 5/25*    (2025.01)
*G08G 5/53*    (2025.01)
*G08G 5/59*    (2025.01)

(52) U.S. Cl.
CPC ................ *G08G 5/55* (2025.01); *G08G 5/25* (2025.01); *G08G 5/53* (2025.01); *G08G 5/59* (2025.01)

(58) Field of Classification Search
CPC .. G08G 5/55; G08G 5/25; G08G 5/53; G08G 5/59; G08G 5/26; G08G 5/21; G08G 5/76
See application file for complete search history.

(56) References Cited

U.S. PATENT DOCUMENTS

| | | | |
|---|---|---|---|
| 2008/0306639 A1* | 12/2008 | Fleury | G08G 5/74 701/8 |
| 2009/0157241 A1 | 6/2009 | Meunier et al. | |
| 2018/0010916 A1* | 1/2018 | Roger | G01C 21/20 |

FOREIGN PATENT DOCUMENTS

EP    3 267 156 A1    1/2018

OTHER PUBLICATIONS

RTCA DO-283B, Standards for Airport Security Access Control Systems, Dec. 2019.
ICAO standard Doc 8168 Pans-Ops, Aircraft Operations, vol. I—Flight Procedures, Sixth Edition, 2018.

* cited by examiner

*Primary Examiner* — Brian P Sweeney
(74) *Attorney, Agent, or Firm* — BakerHostetler (57) ABSTRACT

A method and device for assisting a pilot in flight management by enabling the pilot to anticipate situations involving a risk of collision with another aircraft or with the ground, or to anticipate a risk of deviation from a flight path. The method and device including acquiring current variables of an aircraft in flight, computing a safety corridor around the reference path of the aircraft, computing an immediate predicted actual path, and displaying, superposed on the same screen of the aircraft, the reference path of the aircraft in flight, said immediate predicted actual path and/or said safety corridor.

15 Claims, 6 Drawing Sheets

DEVICE AND METHOD FOR ASSISTING AIRCRAFT GUIDANCE

CROSS-REFERENCE TO RELATED APPLICATIONS

This application is a National Stage of International patent application PCT/EP2021/087160, filed on Dec. 21, 2021, which claims priority to foreign French patent application No. FR 2014079, filed on Dec. 23, 2020, the disclosures of which are incorporated by reference in their entirety.

FIELD OF THE INVENTION

The invention relates to the technical field of flight management systems, and more particularly relates to a method and system for assisting with aircraft guidance.

BACKGROUND

Current aircraft have three piloting-equipment levels:
- a first equipment level consisting of the flight controls, which act directly on the control surfaces and motors;
- a second equipment level consisting of the autopilot and/or the flight director, which act/acts on the flight controls, directly in the case of the autopilot or via the pilot in the case of the flight director, to control the aircraft to a flight parameter such as, for example, heading, roll, pitch, altitude, speed, etc.; and
- a third equipment level consisting of the flight management system (FMS), which is capable of generating a flight plan and of acting on the autopilot or the flight director to have it followed by the aircraft.

The FMS, among its other main functions, generates and automatically monitors a flight plan, a flight plan consisting of lateral and vertical paths that the aircraft must follow to go from the current position occupied thereby in flight to its destination, and of the speeds at which these paths must be travelled.

A flight plan is generated, inter alia, based on imposed waypoints, these potentially being associated with time, altitude, speed and consumption constraints. These imposed waypoints and their associated constraints are entered into the FMS by an operator of the aircraft, for example a member of the crew of the aircraft, by means of keyboard- or screen-based cockpit equipment providing a human-machine interface. Generation of the actual flight plan consists in constructing the lateral and vertical paths of the flight plan based on a sequence of flight legs. The flight plan starts from a departure point, passes through imposed waypoints and ends at an arrival point, while respecting standardized construction rules and while taking into account time, altitude and speed constraints potentially associated with each waypoint. The flight plan therefore defines what may be termed a reference path or planned path, which would be the path flown if all the constraints of the procedure were met.

When an aircraft is flying, the FMS plays a central role in controlling its path. It is the nerve center of this control. When navigation is carried out under FMS control, navigation in managed mode is spoken of: the FMS controls the autopilot and possibly the autothrottle.

In an aircraft equipped with a conventional FMS, the pilot is able to observe the path that the aircraft will fly, this path usually being computed based on assumptions taking the current state of the aircraft into account. The advantage thereof is that the pilot thus knows exactly what the plane is going to do, and hence there will be no surprises guidance-wise; in contrast, the disadvantage thereof is that the pilot does not know if what the plane is going to do complies with what was initially expected in the procedure and/or by air traffic control, and the pilot cannot query this computed path with respect to the reference path or the "on paper" version of the procedure.

Therefore, the pilot may let the aircraft fly the computed path exactly, even if the aircraft will leave the space initially specified in the procedure as a result, typically because of an excessively high manual speed setting. Air traffic could then be put at risk, or a terrain conflict generated or even a population subjected to undesirable noise pollution.

To solve this problem, the pilot keeps the published paper procedure nearby, and regularly checks the path computed by the FMS against the paper procedure.

However, this requires continuous effort on the part of the pilot and it may distract his or her attention from things of importance. In addition, the need to regularly check the displayed path, i.e. the path computed by the FMS, against the paper reference path increases the workload of the pilot. From the perspective of single-pilot aircraft, this workload related to the need to check the path continually is a dimensioning element that must be improved.

Systems intended to partially relieve the burden placed on the pilot do exist, such as:
- systems for monitoring actual navigation performance with respect to the required navigation performance (RNP), which check that the aircraft does not diverge from the computed path (this could happen in the case where a transition with a constrained radius is performed at an excessively unsuitable speed);
- terrain awareness and warning systems (TAWS), which are intended to prevent collisions with the ground in piloted flight (they check that the aircraft will not strike the terrain);
- traffic alert and collision avoidance systems (TCAS, also called airborne alert and collision avoidance systems (ACAS) by the ICAO), which are intended to avoid collisions in flight between aircraft (they check that the path of the aircraft given its heading will not cause a conflict or a risk of collision with the heading of other aircraft).

Patent application US 2008/306639 A1 of the Applicant proposes a device and method for filtering anti-collision alerts in respect of terrain and obstacles, for aircraft, in which the variables (terrain data) are acquired with a view to performing analyses of deviations in position or angle, which are solely used to prevent collision with terrain. A first corridor is defined by an RNP and a second corridor is linked to the terrain, i.e. to topography. The method involves an extrapolation, i.e. a simple propagation along a current vector of an aircraft state or position, but does not involve feedback, convergence or capture and compliance with current constraints and does not take into account the current guidance mode of the aircraft.

All of these known systems are reactive systems, i.e. they alert the pilot once the danger is real. It is therefore not possible for the pilot to anticipate this danger.

In addition, in most cases where the path of the procedure to be followed does not get close to mountains and is not RNP compliant, an imminent excursion of the aircraft from the corridor of the published procedure may not be detected by these various systems.

Another drawback is that the computed lateral deviation or cross track error (XTE or XTK) of the airplane is defined with respect to the lateral path computed by the FMS, and not with respect to the reference path of the procedure, this potentially leading to undetected navigational errors relative to the published procedure. Thus, for example, it is common for airlines to receive complaints about noise pollution as a result of planes being flown over zones that they were not meant to fly over.

Thus, there is a need for advanced systems and methods allowing a pilot to be assisted with flight management in such situations.

SUMMARY OF THE INVENTION

One object of the present invention is to provide a method for assisting a pilot in the management of a flight, allowing him or her to anticipate situations in which there is a risk of collision with another aircraft or with the ground, or a risk of path deviation.

Another object of the invention is to provide a device that comprises means allowing the method of the invention to be implemented.

Advantageously, the device and method of the invention allow information to be delivered to a pilot or to a crew or to a guidance system, at a time prior to the occurrence of a problematic situation, especially deviation of an aircraft from a predefined path or collision of an aircraft with the terrain or with another aircraft.

Generally, the invention consists in computing a short-term predicted actual path of the aircraft (also called the immediate predicted actual path) depending on the current guidance mode, and in presenting it to the pilot superposed, according to the circumstances:

with the reference path of the aircraft, this path being coupled with a lateral RNP or vertical VPPL containment zone (i.e. a safety corridor around the planned path), VPPL being the acronym of vertical path performance limit; or
 with an actual path of another identified nearby vehicle (i.e. one not following its planned path); or
 with a containment zone of a planned path of another identified nearby vehicle.

Advantageously, the method of the invention allows, by virtue of a forward-prediction computation mode, the immediate path that will actually be flown by the aircraft to be computed.

Advantageously, the forward-prediction computation mode allows an actual short-term predicted path to be generated, which, through display thereof superposed with another path, allows the pilot to visually obtain complete awareness of future risky situations. He or she may thus for example view, clearly and immediately, points where the airplane will leave the envelope envisaged in the planned procedure.

Advantageously, the method of the invention may be implemented within the FMS, allowing a pilot alert to be triggered as soon as a short-term conflict is detected between the predicted actual immediate path as computed in forward-prediction mode and, for example:

a containment zone around the planned path (excursion from the containment zone); or
 a safety zone around the path of oncoming traffic (i.e. if TCAS is activated and TCAS tracking is being used); or
 a containment zone of other traffic.

To obtain the sought-after results, a method for assisting with aircraft guidance is provided, the method being intended for an aircraft in flight in a current guidance mode and having a reference path planned in a flight plan, the method being implemented by an aircraft computing platform and comprising at least:

a step of acquiring current variables of an aircraft in flight, said current variables comprising at least state variables characterizing the current state of the aircraft, environment variables characterizing the current environment of the aircraft and path variables characterizing the current path of the aircraft;
 a step of computing a safety corridor around the reference path of the aircraft, said safety corridor being computed to a plurality of predefined thresholds for at least one surveillance axis of the aircraft, said at least one surveillance axis being a lateral axis, a vertical axis, a speed axis, a time axis or a fuel-consumption axis;
 a step of computing an immediate predicted actual path, using said acquired current variables and the current guidance mode of the aircraft, and based on a flight computation mode referred to as the forward-prediction computation mode, allowing short-term predictions to be computed; and
 a configuring step allowing the computed path data and computed safety-corridor data to be combined with a view to displaying, superposed on the same screen of the aircraft, the reference path of the aircraft in flight, said immediate predicted actual path and/or said safety corridor.

According to some alternative or combined embodiments:

The method in addition comprises, after the configuring step, a step of generating a preventive alert if, in the configuring step, analysis of the combination of the computed path data and computed safety-corridor data indicates a risk, in the short- or medium-term, of said immediate predicted actual path meeting said safety corridor.

The method comprises, before the configuring step, a step of comparing said immediate predicted actual path with the reference path for said at least one surveillance axis, and the configuring step in addition allows any deviation of said immediate predicted actual path from the reference path for said at least one surveillance axis of the aircraft to be displayed.

The method comprises, before the configuring step, a step of analyzing said immediate predicted actual path with respect to a reference path of another identified aircraft, for said at least one surveillance axis, and the configuring step also allows data relating to the reference path of the other identified aircraft and to its containment zone to be combined, and any deviation of said immediate predicted actual path of the aircraft in flight from the reference path, for said at least one surveillance axis, that might lead to a risk of said aircraft in flight meeting the other identified aircraft, to be displayed.

The method comprises, before the configuring step, a step of analyzing, for said at least one surveillance axis, the immediate predicted actual path with respect to a zone over which it is dangerous or prohibited to fly, and the configuring step in addition allows the zone over which it is dangerous or prohibited to fly to be displayed and any deviation of the immediate predicted actual path from the reference path, for said at least one surveillance axis, that might run a risk of said aircraft in flight meeting with the zone over which it is dangerous or prohibited to fly, to be displayed.

The step of computing a safety corridor consists in computing a multidimensional safety corridor for two to five control axes of the aircraft in flight, especially a lateral axis and/or a vertical axis and/or a speed axis and/or a time axis and/or a fuel-consumption axis.

The step of computing a multidimensional safety corridor consists in computing, based on one or more predefined thresholds for each surveillance axis, a multidimensional threshold with variable weightings for each of the surveillance axes considered for the multidimensional safety corridor.

The method in addition comprises, after the configuring step, a step of sending an alert to the pilot.

The invention also relates to a device for assisting with aircraft guidance, which comprises an aircraft computing platform allowing the steps of the method for assisting with aircraft guidance of the invention to be implemented.

In one embodiment, the device comprises a display screen for displaying the result of the configuring step of the method of the invention.

In one variant of embodiment, the device in addition comprises audio means for emitting an alert depending on the result of the configuring step of the method of the invention.

In one alternative embodiment, the device comprises communication means for transmitting, to a system external to the aircraft in flight, the result of the configuring step of the method of the invention.

The invention also covers a flight management system (FMS) or an on-board computing system of EFB type that comprises a device for assisting with aircraft guidance according to the invention.

The invention also relates a computer program product that comprises code instructions allowing the steps of the method of the invention to be performed, when the program is executed on a computer.

BRIEF DESCRIPTION OF THE DRAWINGS

Other features and advantages of the invention will become apparent with the aid of the following description and of the figures of the appended drawings, in which.

DETAILED DESCRIPTION

Figure 1:
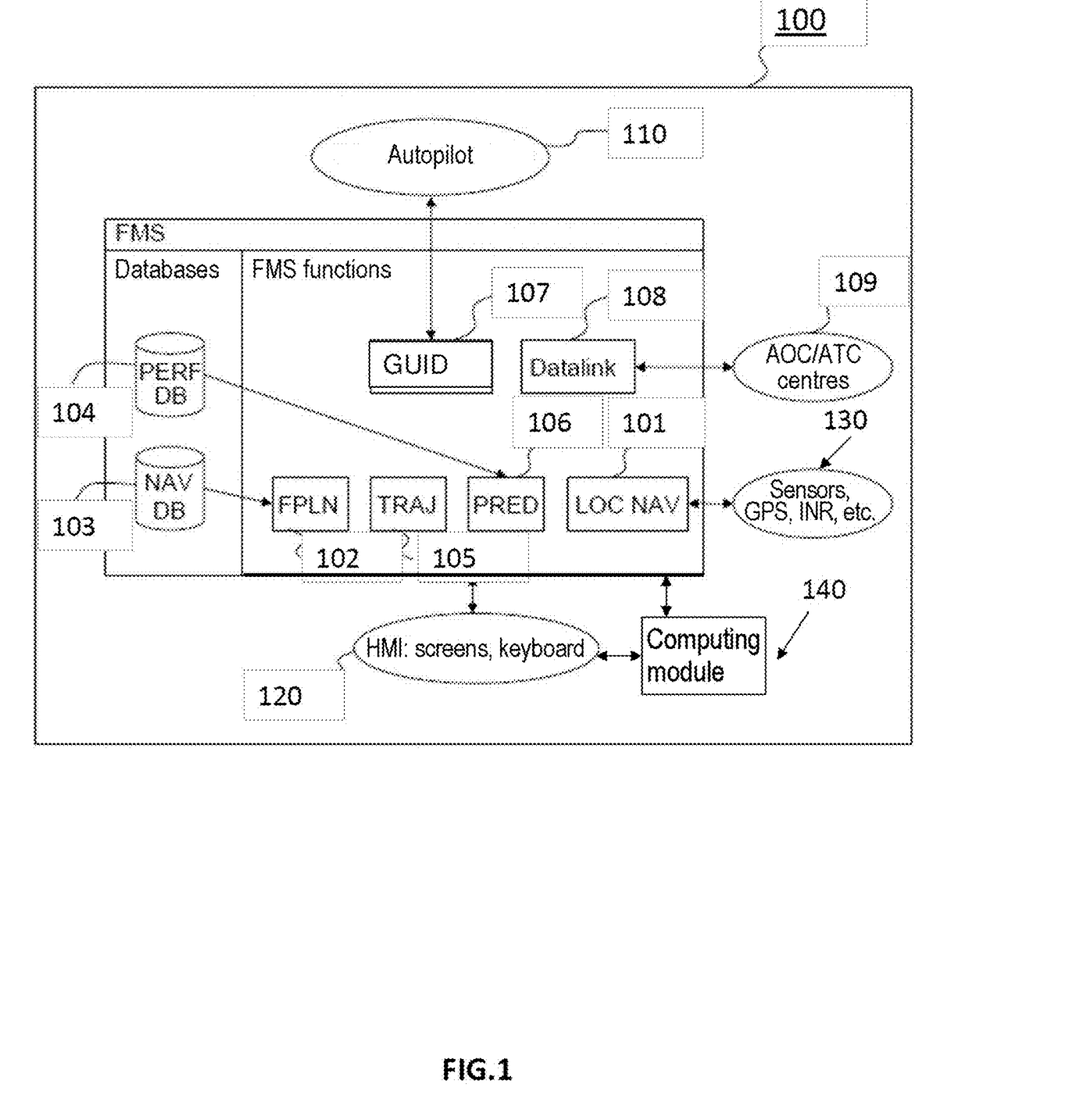
FIG. 1 illustrates a structure of a flight management system (FMS) allowing the device and the method of the invention to be implemented.

FIG. 1 illustrates a structure of a flight management system allowing the method of the invention in one embodiment to be implemented. For example, the system may be an FMS (100) comprising components suitable for performing known functionalities and in addition incorporating a computing module (140) configured to implement the method of the invention.

A known FMS comprises a human-machine interface (120) for example comprising a keyboard and a display screen, or else simply a touch-sensitive display screen, and modules allowing at least the following functions to be performed:

navigation (LOCNAV) (101), to optimally locate the aircraft using geolocation means (130) such as GPS, GALILEO, VHF radio-navigation beacons, and/or inertial measurement units. This module communicates with geolocation devices;

flight plan (FPLN) (102), to input the geographical elements forming the skeleton of the route to be followed, such as the points imposed by departure and arrival procedures, waypoints and airways;

navigation database (NAVDB) (103), to construct geographical routes and procedures based on data included in databases relating to points, beacons, and legs to intercept or altitude;

performance database (PERFDB) (104), containing parameters relating to the aerodynamic performance of the aircraft and to the performance of its engines;

path (TRAJ) (105), to construct and compute, based on the points of the flight plan and on the associated constraints, an optimized and continuous 4D path respecting the capacities of the aircraft and confinement constraints (RNP);

predictions (PRED) (106), to deliver predictions (altitude, time, fuel) in respect of all the points of the flight plan;

guidance (GUID) (107), to deliver commands allowing the aircraft to be guided along the lateral plane, the vertical profile and the velocity profile; and digital data link (DATALINK) (108), to communicate with control centers and other aircraft (109).

The steps of the method of the invention are executed in a dedicated module (140) that is coupled to the modules of the FMS and of the HMI, and which comprises components configured to perform the required computations.

In another mode of implementation, the method of the invention is carried out in a partition of an avionics-specific hardware platform different from that of the FMS, such as one of an electronic flight bag (EFB) for example.

Figure 2:
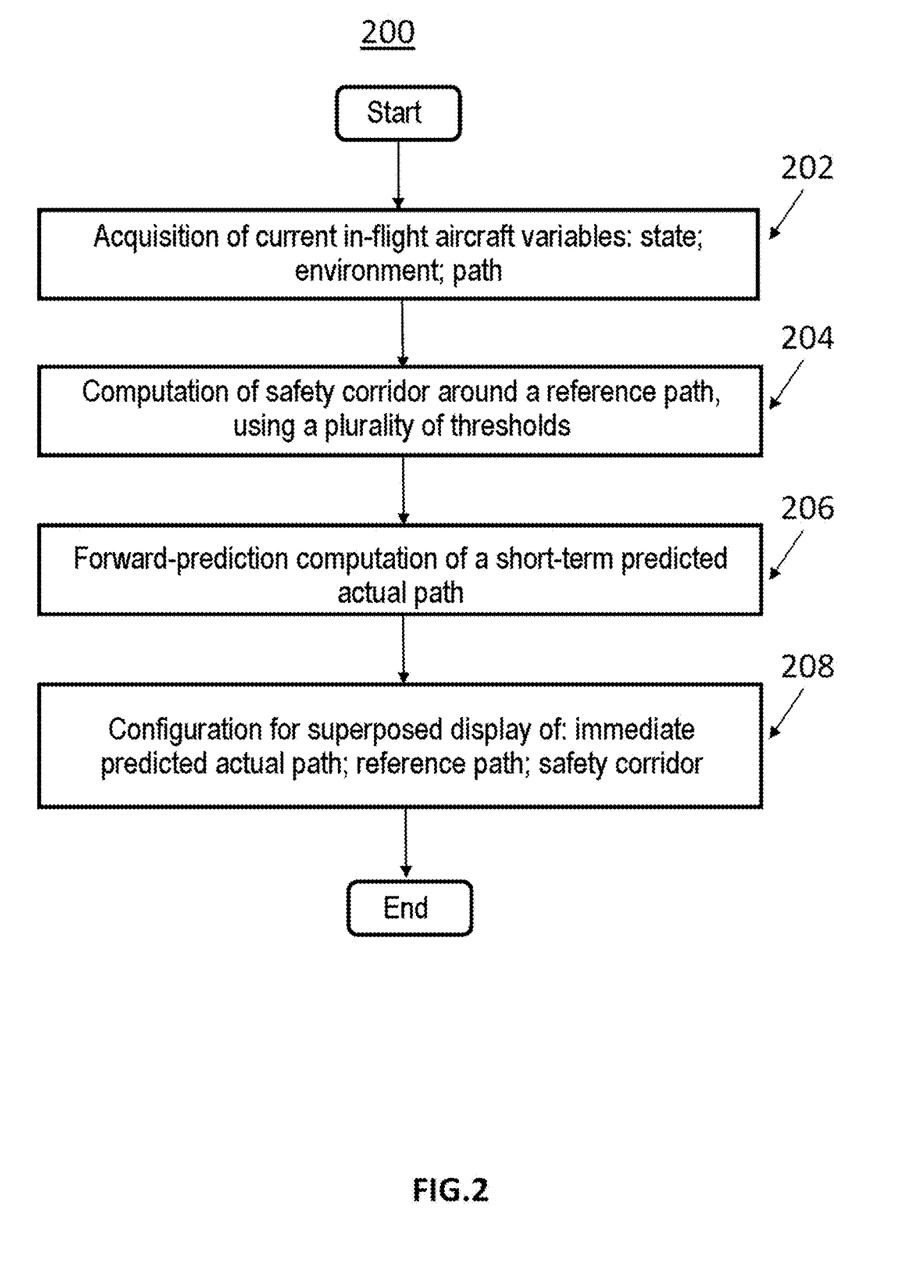
FIG. 2 is a flowchart of the main steps of the method of the invention.

FIG. 2 illustrates the general steps of the method of the invention in one embodiment.

The method 200 for assisting with aircraft guidance according to the invention operates when an aircraft is in flight in a current guidance mode, such as the "managed" mode for example, and has a planned reference path.

The method is implemented by a computing platform (i.e. computer) intended for an aircraft. By way of example of a hardware architecture suitable for implementing the invention, a device may comprise: a communication bus to which is connected a microprocessor or central processing unit (CPU), which may be multi-core or many-core; a read-only memory (ROM) which may contain the programs required to implement the invention; a random-access memory (RAM) or cache memory containing registers suitable for storing variables and parameters created and modified during the execution of the aforementioned programs; and a communication or I/O interface (I/O standing for Input/Output) suitable for transmitting and receiving data. In the case where the invention is implemented via a reprogrammable computing machine (for example an FPGA circuit), the corresponding program (i.e. the sequence of instructions) may be stored in or on a volatile or non-volatile storage medium that is removable or non-removable (for example an SD card, or a bulk storage medium such as a hard disk e.g. an SSD), this storage medium being partially or completely readable by a computer or a processor. Reference to a computer program that, when it is executed, performs any of the functions described above does not merely refer to an application program running on a single host computer. On the contrary, the terms "computer program" and "software" are used herein in a general sense to refer to any type of computer code (for example application software, firmware, microcode, or any other form of computer instruction, such as web services or an SOA, or instructions delivered via application programming interfaces or APIs) that may be used to program one or more processors to implement aspects of the techniques described here. The computing means or resources may especially be distributed (cloud computing), possibly with or using peer-to-peer and/or virtualization technologies. The software code may be executed on any suitable processor (for example a microprocessor) or processor core or set of processors, whether provided in a single computing device or distributed between multiple computing devices. Security technologies (crypto-processors; authentication, optionally biometric authentication; encryption; chip card; etc.) may be used.

In a first step 202, the method allows acquisition of a plurality of types of current variables characterizing the current state of the aircraft in flight, its environment and its context, and especially:

state variables comprising at least the current situation of the aircraft, for instance its position, its roll, its speed, and its altitude;

environment variables comprising at least the current weather around the aircraft;

path variables characterizing the current path of the aircraft, for instance: the curved segment allowing the next change of direction to be made, the maximum roll of the aircraft and, if necessary, planned vertical changes in terms of speed or altitude.

Figure 3A:
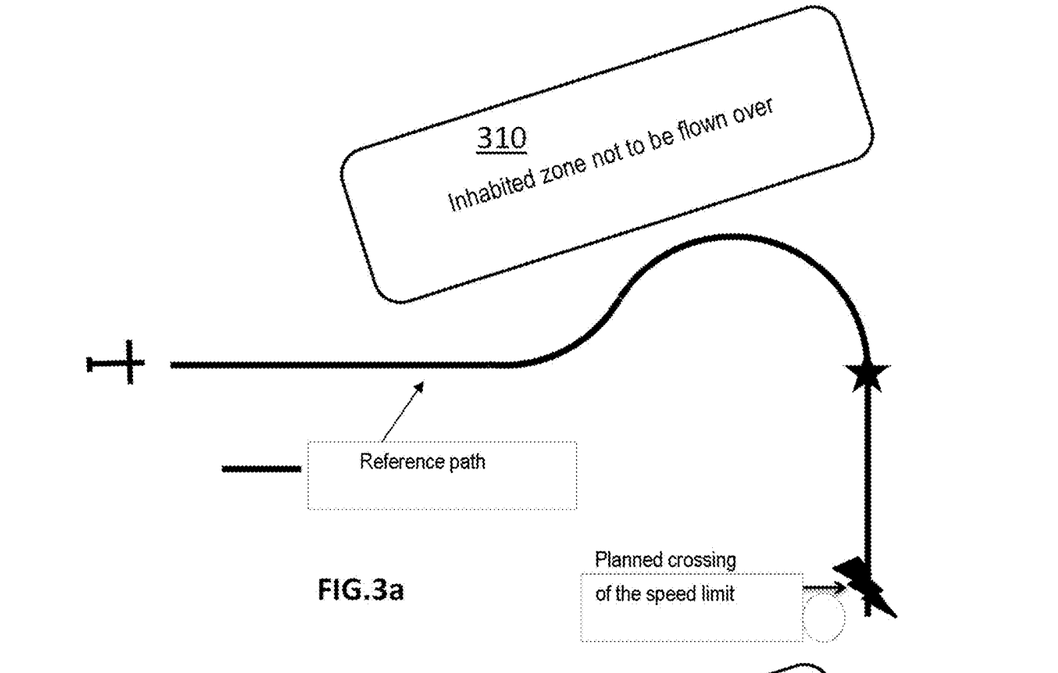
FIG. 3a illustrates one example of a reference path of an aircraft.
Figure 3B:
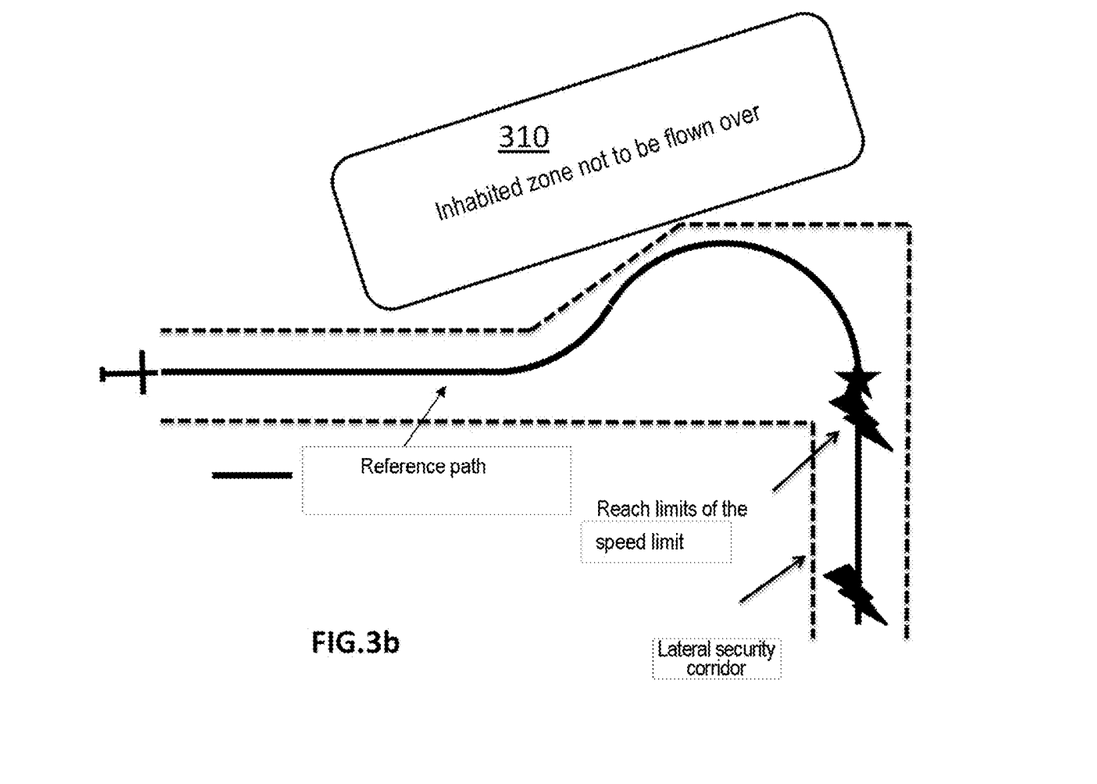
FIG. 3b illustrates one example of a reference path of an aircraft with a lateral safety corridor.

In a following step 204, the method allows computation of a safety corridor around the reference path of the aircraft in flight. FIG. 3a illustrates one example of a reference path of an aircraft, and FIG. 3b illustrates one example of a reference path of an aircraft with a lateral safety corridor of width set per route segment (generally the RNP value), the corridor being centered on the nominal path and being associated with specific protection areas for turns, such as for example defined in the ICAO standard Doc 8168 PANS-OPS.

In one embodiment, the corridor is computed to a plurality of predefined thresholds, generally one for each route segment (as defined in the navigation database or else modified by the pilot), for at least one surveillance axis of the aircraft. A surveillance axis may be the lateral axis (the thresholds then depending on the required navigation performance or RNP, which ranges from 0.1 to 10 NM), the vertical axis (the threshold value varying for example from 150 to 260 feet according to the standard RTCA DO-283B), the speed axis (the threshold value may be 5 or 10 kt according to the same standard or even a speed percentage, 10% for example), the time axis (the threshold value may be 10 or 30 seconds according to the same standard or 60 seconds according to current practice), or even the fuel-consumption axis (there is no predefined threshold value to date, but a percentage of 1% corresponds to what is currently used).

In one variant of embodiment, the step of computing a safety corridor consists in computing a multidimensional safety corridor for at least two surveillance axes, but which may be computed for the five surveillance axes of the aircraft, i.e. the lateral axis, vertical axis, speed axis, time axis and fuel-consumption axis.

The step of computing a multidimensional safety corridor generally consists in computing, based on one or more predefined thresholds for each surveillance axis, a single threshold called the multidimensional threshold, which is obtained by applying variable weightings to the thresholds of each of the surveillance axes taken into account. Such a multidimensional corridor will for example be a 3D corridor, the multidimensional threshold possibly being either the sum of the thresholds on each axis or the quadratic sum of these thresholds, identical weightings being considered in both cases. Another example of a multidimensional corridor, taking into account a time constraint, will give the above sum of thresholds a weighting of 1, while the threshold on the time axis will be given a lower weighting (expressing the lower priority of the time constraint with respect to the other constraints on the 3D corridor).

In a following step 206, the method allows real-time computation of the short-term path of the aircraft (i.e. of the immediate predicted actual path over a time window ranging from a few seconds to a few minutes), taking into account the various current variables noted beforehand and the guidance mode of the aircraft.

Advantageously, the computation of the immediate predicted actual path implements a forward-prediction algorithm.

This computation mode, which is anticipatory over the short-term, employs propagation of the current variables of an aircraft state vector, by a propagator using the current guidance mode, the current reference path including the current route, altitude and speed or thrust constraints, and the local environment variables (delivered by aircraft sensors).

The environment variables are the result of blending of the current situation recorded by the aircraft sensors and of the predicted situation, as provided by weather-forecasting organizations and entered at corresponding points (by the pilot).

The blending is a conventional linear correlation as a function of the distance between a start point (here the airplane) and an end point (here the next waypoint), in which the variable is proportional to the end values of the segment and to its relative distance over this segment.

In other more mathematical terms, letting V0 and D0 be a value and a distance at a time 0, and (VF, DF) a value and distance at point F, respectively, the value at a distance d between D0 and DF is equal to:

$$V=V0+(VF-V0)/(DF-D0)*(d-D0).$$

This is a blending operation according to a law of the 1st order. However, it is possible to employ another linear variation.

In contrast, long-term predictions, which are said to be computed backward, compute predictions backwards based on the route, on vertical-profile constraints and on long-term weather forecasts (which are inserted up to interception with the aircraft state vector). They do not use blending.

Such backward predictions are frozen; in descent they become the reference profile, whereas forward predictions continue to be computed.

Figure 3C:
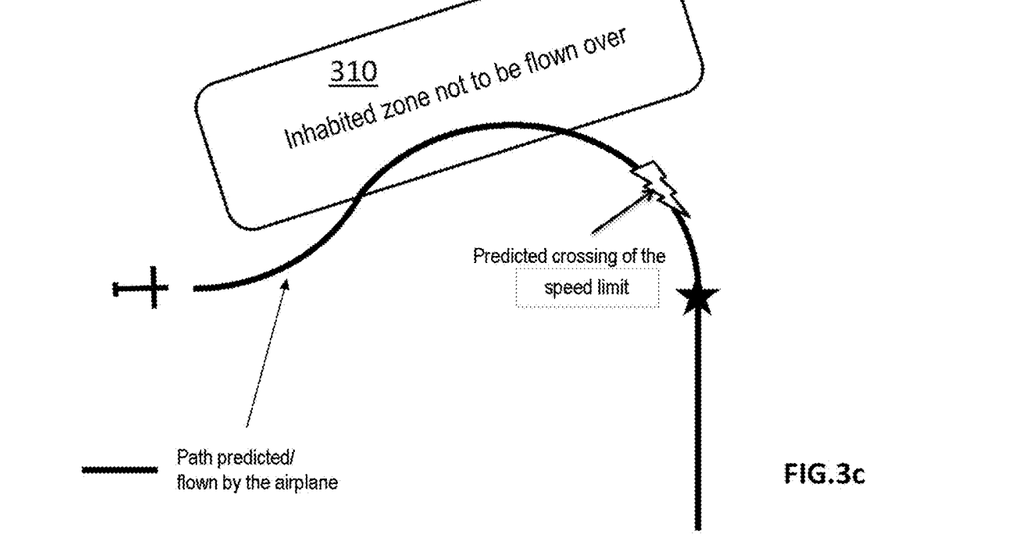
FIG. 3c illustrates one example of a predicted actual immediate path.

FIG. 3c illustrates one example of an immediate predicted actual path in which it is indicated (white arrow) that it is predicted that the speed limit permitted by the procedure will be crossed.

In a following step 208, the method allows the various data of the reference path, of the immediate predicted actual path and of the safety corridor to be taken into account and combined to configure superposed display thereof on the same screen of the aircraft.

Figure 3D:
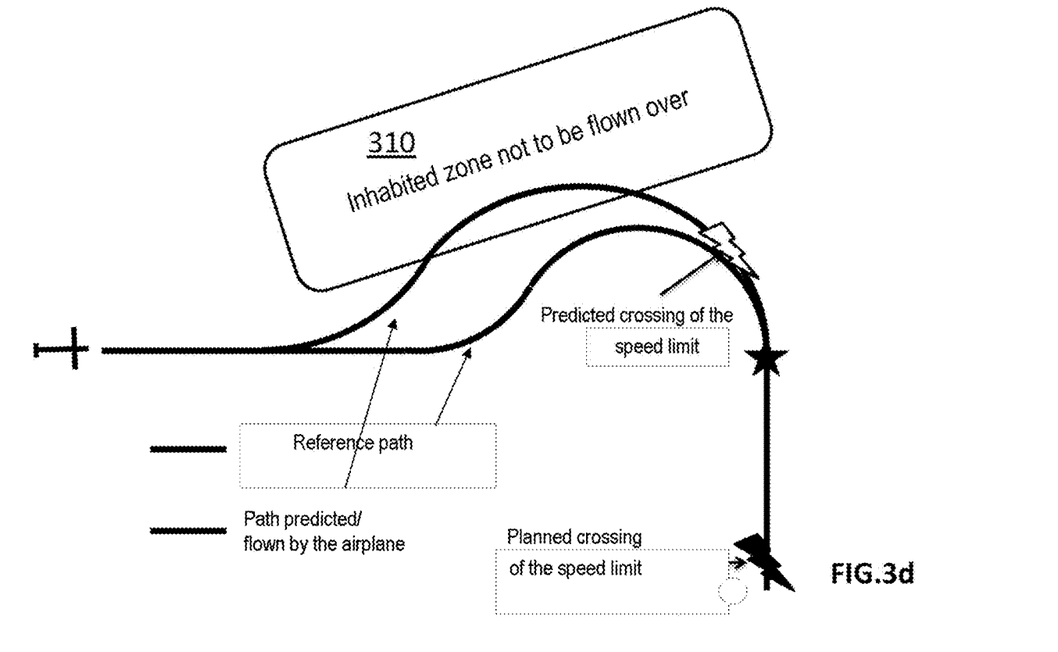
FIG. 3d illustrates one example of superposed display of a predicted actual immediate path and of a reference path, illustrating a risk of flight over a prohibited zone.
Figure 3E:
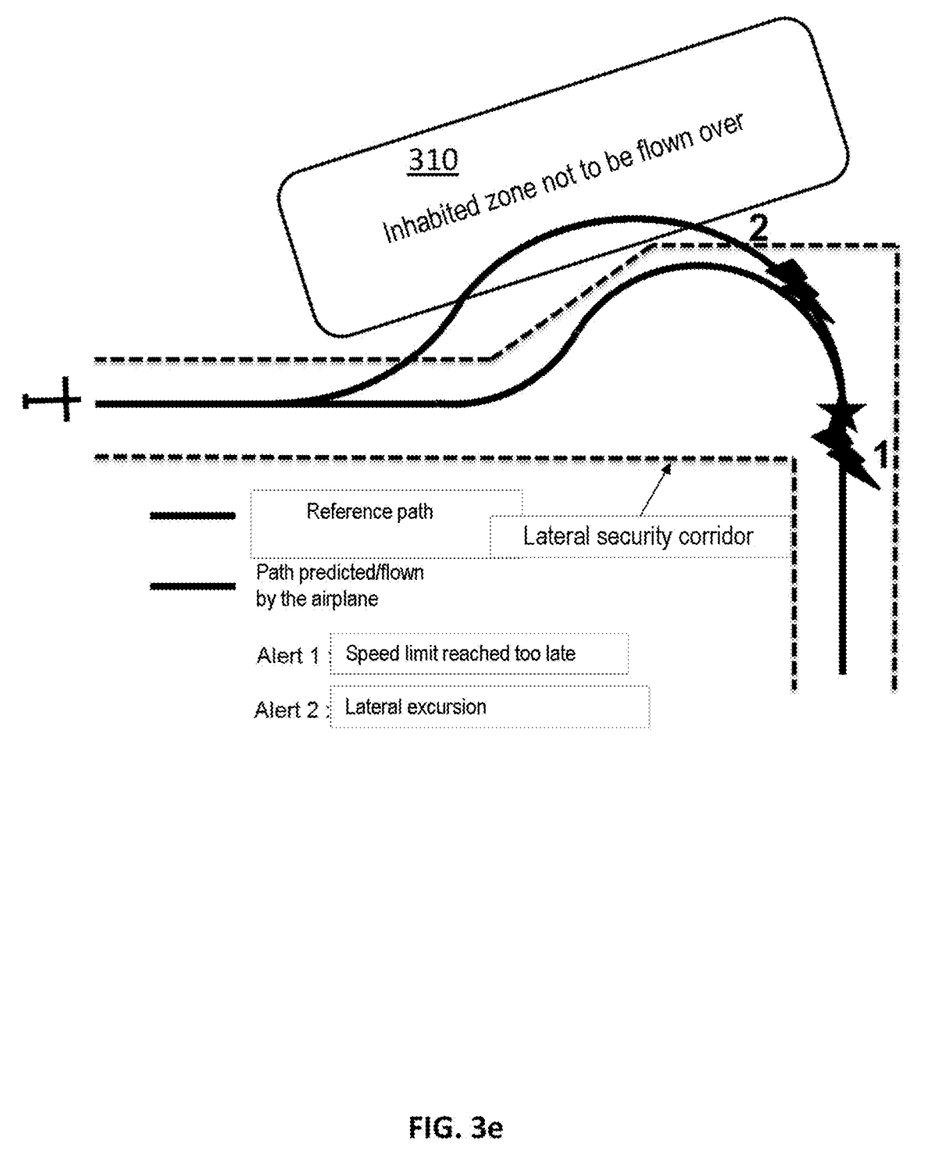
FIG. 3e illustrates one example of superposed display of a predicted actual immediate path, of a lateral safety corridor and of a reference path, illustrating a risk of excursion from the corridor and a risk of flight over a prohibited zone.

FIG. 3d illustrates one example of superposed display of a predicted actual immediate path and of a reference path, and FIG. 3e illustrates one example of superposed display of a predicted actual immediate path and of the lateral safety corridor of a reference path.

The example chosen to illustrate superposed display in FIGS. 3a to 3e also contains a zone 310 over which it is prohibited to fly, and in FIG. 3e the pilot is very easily and clearly able to understand, by viewing the immediate predicted real path, that following the latter would take the aircraft above the zone over which it is prohibited to fly. Such unexpected flight over a zone 310 over which it is prohibited to fly may occur in cases where the aircraft is descending at excessive speed, for example. This excessive speed may especially be caused by late crossing (compared to the on-paper procedure) of the speed limit in question, itself induced by late descent of the aircraft.

The method of the invention may comprise a step of analyzing the immediate predicted actual path with respect to a zone over which it is dangerous or prohibited to fly, and the configuring step in addition allows the zone over which it is dangerous or prohibited to fly to be displayed and any deviation of the immediate predicted actual path from the reference path that might run a risk of the aircraft in flight meeting with the zone over which it is dangerous or prohibited to fly, to be displayed.

The step 208 of configuring superposed display may in addition allow any deviation of the immediate predicted actual path from the reference path to be displayed for one or more surveillance axes. The method then in addition allows a comparison to be made between the values of data relating to each surveillance axis, of the immediate predicted actual path and of the reference path.

The configuring step 208 may, in one variant of embodiment, comprise a step of analyzing data relating to one or more surveillance axes of the immediate predicted actual path of the aircraft in flight, and data of a reference path of another identified aircraft, and allow the reference path of another identified aircraft with its containment zone to be displayed superposed and any deviation of the immediate predicted actual path of the aircraft in flight from the reference path that might run a risk of said aircraft in flight meeting the other identified aircraft, to be displayed.

Figure 3F:
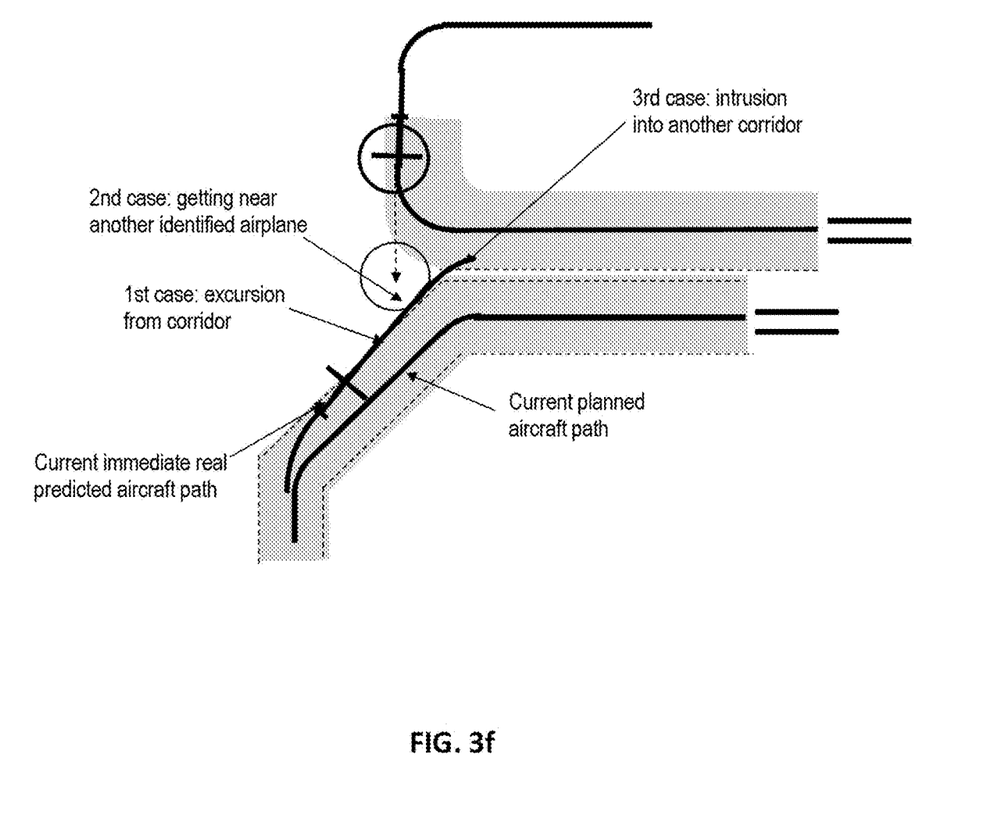
FIG. 3f illustrates one example of superposed display of paths and of containment zones, illustrating various collision risks.

FIG. 3f illustrates one example of superposed display of a plurality of paths (reference path of the aircraft in flight; immediate actual predicted path of the aircraft in flight) and of confinement zones (zone for the reference path of the aircraft in flight; zone for the reference path of another aircraft). The display of FIG. 3f allows various risk predictions to be viewed, for example for two aircraft flying parallel approaches to the same airport:

$1^{st}$ case: risk of excursion from the safety corridor by the aircraft in flight;

$2^{nd}$ case: risk of the aircraft in flight getting dangerously near to the other aircraft, the other aircraft possibly being detected via a TCAS alert indicating nearness to an identified aircraft, or via reception of information through an interactive surveillance system such as ADS-B system (ADS-B being the acronym of automatic dependent surveillance-broadcast);

$3^{rd}$ case: risk of intrusion of the aircraft in flight into the containment zone of the other aircraft, the planned path of which may be known to the aircraft in flight through an ADS-B system for example.

Depending on the mode of implementation and the human-machine interface on which the display is generated, the paths may be differentiated using a specific color code. In the same way, in case of excursion from the safety corridor, the portion of the predicted actual path that departs the safety zone may be highlighted visually using a specific color code or an appropriate sign (one that flashes for example). Those skilled in the art will understand that the data-configuring step may be adapted depending on the application, whether to take into account the type of aircraft or the nature of the path deviation generating a risk to be flagged to the pilot.

In one embodiment, the configuring step 208 in addition allows configuration of an alert indicating that the predicted actual path of the aircraft in flight and its safety corridor will meet (i.e. intersect) in the short- or medium-term, or that a larger excursion from the safety corridor will occur, if analysis of the combination of the computed path data and computed safety-corridor data indicates a risk, in the short- or medium-term, of said immediate predicted actual path meeting said safety corridor.

Advantageously, and in contrast to known impact- or collision-warning systems, the alert generated by the method of the invention is a preventive alert, i.e. an anticipatory alert that allows the pilot to take immediate and appropriate reactive action.

Returning to FIG. 3e, this figure illustrates, on the superposed display, alert symbology intended for the attention of the pilot, showing, in the chosen example, a first alert "Alert 1" providing an anticipatory indication of the place on the immediate predicted path where the predicted speed will exceed the limit speed constraint, given the defined speed threshold, and showing a second alert "Alert 2" providing an anticipatory indication of the place on the immediate actual predicted path where an excursion of the predicted position of the aircraft from the safety zone will occur.

In an optional step, the method may generate, after the step 208 of configuring the superposed display, a step of triggering an audio alert and/or of sending an alert message to the pilot and/or co-pilot.

In an optional step, in case of excessive excursion with respect to the procedure, the method of the invention allows the immediate predicted actual path computed by forward prediction to be sent to an external system for anticipating a terrain problem—for example it may be sent to a strategic TAWS (in contrast to current tactical TAWS).

Embodiments of the device and method for assisting with flight management according to the invention have thus been described. A person skilled in the art will be able to apply variants of embodiment on the basis of the described principles.

The device and method of the invention assist the pilot in flight management in at least three ways:

They give him or her a better awareness of what he or she is doing, less effort being required to challenge the path computed by the FMS versus the reference path of the procedure. This decrease workload and mental load, meaning he or she may switch his or her attention to other activities inherent to his or her function.

They increase his or her readability of the path. Specifically, it is currently difficult for the pilot, when the guidance mode is not wholly in managed mode, to understand what assumptions have been made by the FMS computing and displaying the path (begin to descend, change speed, etc.). The superposed display proposed by the invention thus increases the confidence that the pilot may have in the system and may allow needless stressful situations to be avoided.

They provide him or her with a preventive alert function. If the path becomes unsafe or if it deviates too much from the planned one (with a risk of departure from the corridor or of a conflict with other traffic or with the terrain), an anticipatory alert may be delivered to the pilot, thus warning him or her immediately of an action that he or she may be required to take on his or her aircraft.

The invention claimed is:

1. A method for assisting with aircraft guidance for an aircraft in flight in a current guidance mode and having a reference path planned in a flight plan, the method being implemented by a computing device implemented in an aircraft computing platform and comprising at least:
  a step of acquiring current variables of an aircraft in flight with the computing device, said current variables comprising at least state variables characterizing a current state of the aircraft, environment variables characterizing a current environment of the aircraft and path variables characterizing a current path of the aircraft;
  a step of computing a safety corridor around the reference path of the aircraft with the computing device, said safety corridor being computed to a plurality of predefined thresholds for at least one surveillance axis of the aircraft, said at least one surveillance axis being a lateral axis, a vertical axis, a speed axis, a time axis or a fuel-consumption axis;
  a step of computing an immediate predicted actual path with the computing device, using said acquired current variables and the current guidance mode of the aircraft, and based on a flight computation mode referred to as a forward-prediction computation mode, allowing short-term predictions to be computed;
  a step of comparing said immediate predicted actual path with the reference path for said at least one surveillance axis with the computing device; and
  a configuring step of configuring computed path data and computed safety-corridor data to be combined for displaying with the computing device, and displaying superposed on a same screen of a human machine interface of the aircraft, the reference path of the aircraft in flight, said immediate predicted actual path and/or said safety corridor,
  wherein the configuring step in addition allows any deviation of said immediate predicted actual path from the reference path for said at least one surveillance axis of the aircraft to be displayed.

2. The method as claimed in claim 1, in addition comprising, after the configuring step, a step of generating a preventive alert if, in the configuring step, analysis of the combination of the computed path data and computed safety-corridor data indicates a risk, in a short-term or a medium-term, of said immediate predicted actual path meeting said safety corridor.

3. The method as claimed in claim 1, comprising, before the configuring step, a step of analyzing said immediate predicted actual path with respect to a reference path of another identified aircraft, for said at least one surveillance axis, and wherein the configuring step also configures data relating to the reference path of the another identified aircraft and to its containment zone to be combined, and any deviation of said immediate predicted actual path of the aircraft in flight from the reference path, for said at least one surveillance axis, that might lead to a risk of said aircraft in flight meeting the another identified aircraft, to be displayed.

4. The method as claimed in claim 1, comprising, before the configuring step, a step of analyzing, for said at least one surveillance axis, the immediate predicted actual path with respect to a zone over which it is dangerous or prohibited to fly, and wherein the configuring step in addition allows the zone over which it is dangerous or prohibited to fly to be displayed and any deviation of the immediate predicted actual path from the reference path, for said at least one surveillance axis, that might run a risk of said aircraft in flight meeting with the zone over which it is dangerous or prohibited to fly, to be displayed.

5. The method as claimed in claim 1, wherein the step of computing a safety corridor consists in computing a multidimensional safety corridor for two to five surveillance axes of the aircraft in flight, especially a lateral axis and/or a vertical axis and/or a speed axis and/or a time axis and/or a fuel-consumption axis.

6. The method as claimed in claim 5, wherein the step of computing a multidimensional safety corridor consists in computing, based on one or more predefined thresholds for each surveillance axis, a multidimensional threshold with variable weightings for each of the surveillance axes considered for the multidimensional safety corridor.

7. The method as claimed in claim 1, further comprising, after the configuring step, a step of sending an alert to a pilot.

8. A non-transitory computer program product, said non-transitory computer program product comprising code instructions implementing the steps of the method as claimed in claim 1, when said non-transitory computer program product is executed on the computing device.

9. A computing device for assisting with aircraft guidance, comprising at least one aircraft computing platform configured and/or operable to implement the steps of the method for assisting with aircraft guidance as claimed in claim 1; and
  the computing device further comprising a communication bus connected to a microprocessor, a read-only memory (ROM), a random-access memory (RAM), and a communication interface configured and/or operable for transmitting and receiving data.

10. A flight management system or FMS or an on-board computing system of an EFB type comprising a computing device configured and/or operable to implement a method for assisting with aircraft guidance for an aircraft in flight in a current guidance mode and having a reference path planned in a flight plan, the method being implemented by the computing device and comprising at least:
  a step of acquiring current variables of an aircraft in flight with the computing device, said current variables comprising at least state variables characterizing a current state of the aircraft, environment variables characterizing a current environment of the aircraft and path variables characterizing a current path of the aircraft;
  a step of computing a safety corridor around the reference path of the aircraft with the computing device, said safety corridor being computed to a plurality of predefined thresholds for at least one surveillance axis of the aircraft, said at least one surveillance axis being a lateral axis, a vertical axis, a speed axis, a time axis or a fuel-consumption axis;
  a step of computing an immediate predicted actual path with the computing device, using said acquired current variables and the current guidance mode of the aircraft, and based on a flight computation mode referred to as a forward-prediction computation mode, allowing short-term predictions to be computed;

a step of comparing said immediate predicted actual path with the reference path for said at least one surveillance axis with the computing device; and a configuring step of configuring computed path data and computed safety-corridor data to be combined for displaying with the computing device, and displaying superposed on a same screen of a human machine interface of the aircraft, the reference path of the aircraft in flight, said immediate predicted actual path and/or said safety corridor, wherein the configuring step in addition allows any deviation of said immediate predicted actual path from the reference path for said at least one surveillance axis of the aircraft to be displayed; and the computing device further comprising a communication bus connected to a microprocessor, a read-only memory (ROM), a random-access memory (RAM), and a communication interface configured and/or operable for transmitting and receiving data.

11. A computing device for assisting with aircraft guidance, comprising at least one aircraft computing platform configured and/or operable to implement the steps of the method for assisting with aircraft guidance as claimed in claim 1, and the computing device further comprising:
a display screen for displaying on the same screen of the aircraft, the reference path of the aircraft in flight, said immediate predicted actual path and/or said safety corridor; and
a communication bus connected to a microprocessor, a read-only memory (ROM), a random-access memory (RAM), and a communication interface configured and/or operable for transmitting and receiving data.

12. A computing device for assisting with aircraft guidance, comprising at least one aircraft computing platform configured and/or operable to implement the steps of the method for assisting with aircraft guidance as claimed in claim 1, and the computing device further comprising:
a device for emitting an audio alert based on the reference path of the aircraft in flight, said immediate predicted actual path and/or said safety corridor; and
a communication bus connected to a microprocessor, a read-only memory (ROM), a random-access memory (RAM), and a communication interface configured and/or operable for transmitting and receiving data.

13. A computing device for assisting with aircraft guidance, comprising at least one aircraft computing platform configured and/or operable to implement the steps of the method for assisting with aircraft guidance as claimed in claim 1, and the computing device further comprising:
a communication device for transmitting, to a system external to the aircraft in flight, the reference path of the aircraft in flight, said immediate predicted actual path and/or said safety corridor; and
a communication bus connected to a microprocessor, a read-only memory (ROM), a random-access memory (RAM), and a communication interface configured and/or operable for transmitting and receiving data.

14. The method as claimed in claim 1, further comprising:
incorporating the computing device into the aircraft computing platform,
wherein the aircraft computing platform comprises a flight management system (FMS) and/or an electronic flight bag (EFB).

15. The method as claimed in claim 1, wherein the computing device is implemented in an avionics-specific hardware platform.

* * * * *